United States Patent Office 3,595,961
Patented July 27, 1971

3,595,961
HYPOTENSIVE COMPOSITIONS CONTAINING 2-(2'-HALO-ANILINO) - 1,3 - DIAZACYCLOPENTENES-(2) AND METHODS OF USING THE SAME
Helmut Stähle, Herbert Köppe, Karl Zeile, and Martin Wolf, Ingelheim am Rhein, and Wolfgang Hoefke, Budenheim (Rhine), Germany, assignors to Boehringer Ingelheim G.m.b.H., Ingelheim am Rhein, Germany
No Drawing. Original application Sept. 30, 1966, Ser. No. 583,421, now Patent No. 3,462,433, dated Aug. 9, 1969. Divided and this application Apr. 17, 1969, Ser. No. 817,200
Claims priority, application Germany, Oct. 1, 1965, B 83,965
Int. Cl. A61k 15/12
U.S. Cl. 424—273                    14 Claims

ABSTRACT OF THE DISCLOSURE

Hypotensive compositions comprising a deriative of 2-(2'-halo-anilino)-1,3-diazacyclopentene-(2) as an active ingredient, and a method of reducing the blood pressure in warm-blooded animals therewith.

---

This is a division of copending application Ser. No. 583,421, filed Sept. 30, 1966, now U.S. Pat. No. 3,462,433.

The present invention relates to hypotensive compositions comprising as an active hypotensive ingredient a novel derivative of 2 - (2'-halo-anilino)-1,3-diazacyclopentene-(2), as well as to a method of reducing the blood pressure in warm-blooded animals therewith.

More particularly, the present invention relates to hypotensive compositions comprising as an active hypotensive ingredient a member of a novel class of 2-(2'-haloanilino)-1,3-diazacyclopentenes-(2) of the formula

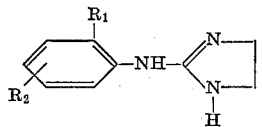

wherein $R_1$ is chlorine, bromine or fluorine, and
$R_2$ is bromine, fluorine, 3-, 4-, or 5-trifluoromethyl, 4-cyano, or 3- or 5-chloro, provided, however, that $R_1$ and $R_2$ are not both chlorine or bromine at the same time, or a non-toxic, pharmacologically acceptable acid addition salt thereof, as well as to a method of lowering the blood pressure in warm-blooded animals therewith.

The compounds defined by Formula I above may be prepared by any of the known methods for the preparation of 2-arylamino-1,3-diazacyclopentenes, such as those described in U.S. Pats. 2,899,426, 3,202,660 and 3,236,857. However, the following methods have provided to be particularly convenient and efficient:

Method A.—By reacting an isothiouronium salt of the formula

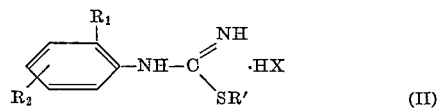

wherein $R_1$ and $R_2$ have the same meanings as in Formula I, R' is lower alkyl, and X is the anion of an acid, preferably the anion of a hydrohalic acid, with ethylenediamine.

The reaction may be carried out with or without an inert solvent. Thus, the reaction may be effected by simply heating a mixture of the reactants to between 100 and 200° C., whereby satisfactory yields of the desired end product are obtained. Alternatively, the reaction may also be carried out at relatively low temperatures (60–140° C.) in the presence of a suitable inert solvent, preferably one which contains polar groups, such as water or a lower alkanol; however, under these conditions longer reaction periods must be accepted if good yields are to be achieved.

The isothiouronium salt of the Formula II may itself be prepared by customary methods, such as by heating a thiourea derivative of the Formula III below, obtained from a correspondingly substituted aniline and ammonium thiocyanate (Houben-Weyl, vol. 9, p. 887), with an alkylating agent, such as a lower alkyl halide or a di-lower alkylsulfate.

Method B.—By reacting an N-phenyl-thiourea compound of the formula

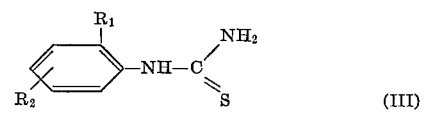

wherein $R_1$ and $R_2$ have the same meanings as in Formula I, with ethylenediamine. The reaction is advantageously performed by heating a mixture of the reactants, preferably in a vacuum, using a stoichiometric excess of ethylenediamine.

The N-phenyl-thiourea compound of the Formula III may be obtained from a correspondingly substituted aniline and ammonium thiocyanate, as indicated above.

Method C.—By subjecting an N-phenyl-N'-(β-aminoethyl)-urea compound or -thiourea compound of the formula

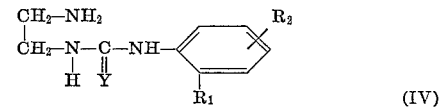

wherein $R_1$ and $R_2$ have the same meanings as in Formula I and Y is oxygen or sulfur, to pyrolysis to effect ring closure of the diazacyclopentene ring.

A starting compound of the Formula IV may itself be obtained by reacting a corresponding substituted phenyl-isocyanate or phenyl-isothiocyanate with ethylenediamine, pursuant to the method described in Journal of Organic Chemistry, vol. 24, page 818 (1959).

The end products obtained by Methods A through C, that is, the compounds embraced by Formula I, are organic bases and form non-toxic salts, especially non-toxic, pharmacologically acceptable acid addition salts, with various inorganic or organic acids and synthetic acid resins. Examples of non-toxic, pharmacologically acceptable acid addition salts include, but are not limited to, those formed with hydrochloric acid, hydrobromic acid, phosphoric acid, sulfuric acid, nitric acid, oxalic acid, 8 - chlorotheophylline or the like. An example of a non-toxic salt with an acid synthetic resin is that formed with a cross-linked polystyrene polymer containing sulfonic acid groups, such as "Zeo-Karb 225" (manufactured by The Permutit Co., New York).

The following examples further illustrate the present invention and will enable others skilled in the art to understand it more completely. It should be understood, however, that the invention is not limited to the particular examples given below.

EXAMPLE 1

Preparation of 2-(2'-chloro-5'-trifluoromethyl-anilino)-1,3-diazacyclopentene-(2) by method A A mixture of 15.8 gm. (0.04 mol) of N-(2-chloro-5-trifluoromethyl-phenyl)-isothiouronium hydroiodide, 4 cc. of ethylenediamine (150% of the stoichiometrically required amount) and 50 cc. of methanol was refluxed for 24 hours. Thereafter, the methanol and the excess unreacted ethylenediamine were distilled off in vacuo, the residue was taken up in 20 cc. of methanol, and the resulting solution was made alkaline with 30 cc. of aqueous 30% potassium hydroxide. The initially oily precipitate formed thereby became crystalline after cooling the reaction mixture with ice; it was isolated by vacuum filtration, washed with water and dried. 5 gm. (47.6% of theory) of 2-(2'-chloro - 5'-trifluoromethyl-anilino)-1,3-diazacyclopentene-(2), M.P. 121–123° C., of the formula

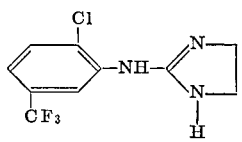

were obtained.

EXAMPLE 2

Preparation of 2-(2'-chloro-4'-fluoro-anilino)-1,3-diazacyclopentene-(2) by method A A mixture of 27.7 gm. (0.09 mol) of N-(2-chloro-4-fluoro-phenyl)-isothiouronium hydroiodide and 8 cc. of ethylenediamine (150% of the stoichiometrically required amount) was heated, without a solvent, to 140° C. and was maintained at that temperature for 45 minutes. Thereafter, the excess unreacted ethylenediamine was evaporated in vacuo, the residue was taken up in dilute aqueous hydrochloric acid at about 70° C., and the solution was made alkaline with 5 N sodium hydroxide. The initially oily precipitate formed thereby became crystalline after cooling the reaction mixture with ice; it was separated by vacuum filtration, washed with water and with petroleum ether at 40° C., and recrystallized from benzene/petroleum ether. 5.2 gm. (29.7% of theory) of pure 2-(2'-chloro-4'-fluoro-anilino)-1,3-diazacyclopentene-(2), M.P. 132–132.5° C., of the formula

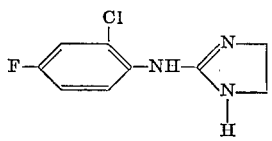

were obtained.

Its hydrochloride, obtained by acidifying an ethereal solution of the free base with ethereal hydrochloric acid, had a melting point of 161–163° C., was freely soluble in water, and was thin-layer chromatographically pure.

EXAMPLE 3

Using a procedure analogous to that described in Example 1, 2-(2'-chloro-4'-trifluoromethyl-anilino)-1,3-diazacyclopentene-(2), M.P. 112° C., was prepared from N - (2 - chloro-4-trifluoromethyl-phenyl)-isothiouronium hydroiodide and ethylenediamine. The yield was 15.4% of theory.

Its nitrate had a melting point of 138–140° C.

EXAMPLE 4

Preparation of 2-(2'-chloro-4'-bromo-anilino)-1,3-diazacyclopentene-(2) by method A A mixture of 24.3 gm. (0.1 mol) of 2-chloro-4-bromo-aniline hydrochloride, 8 gm. (0.105 mol) of ammonium thiocyanate and 130 cc. of chlorobenzene was heated for about ten hours at 95–100° C. Thereafter, the reaction mixture was cooled, the precipitate formed thereby was collected by vacuum filtration, washed with water and petroleum ether, digested with 200 cc. of water, 200 cc. of petroleum ether were added, the mixture was made alkaline with sodium carbonate, and the precipitate was separated by vacuum filtration. 26.54 gm. (0.1 mol) of N-(2-chloro-4-bromo-phenyl)-isothiourea were obtained, which were admixed with 100 cc. of methanol and 21.3 gm. (0.15 mol) of methyliodide, and the mixture was boiled for 1.5 hours. Thereafter, the reaction mixture was evaporated in vacuo, and the residue was dried. 40.7 gm. (0.1 mol) of N-(2-chloro-4-bromo-phenyl)-isothiouronium hydroiodide were obtained. This product was admixed wtih 70 cc. of methanol and 9 gm. (0.15 mol) of ethylenediamine, and the mixture was refluxed for 16 hours. Thereafter, the methanol was distilled off in vacuo, the residue was dissolved in a small amount of methanol, and the solution was made alkaline with aqueous 50% potassium hydroxide, cooled and then vigorously stirred with petroleum ether. The insoluble matter was separated by vacuum filtration, washed with water, dried and recrystallized from benzene/petroleum ether, yielding 2-(2'-chloro-4'-bromo-anilino)-1,3-diazacyclopentene-(2), M.P. 142–145° C. of the formula

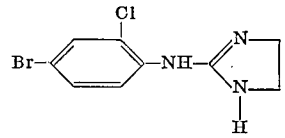

This free base product was dissolved in ether, the solution was acidified with ethereal hydrochloric acid, and the precipitate formed thereby was recrystallized from methanol/ether, yielding thin-layer-chromatographically pure 2-(2' - chloro-4'-bromo-anilino)-1,3-diazacyclopentene-(2) hydrochloride, M.P. 203–205° C.

EXAMPLE 5

Using a procedure analogous to that described in Example 4, 2-(2'-bromo-5'-chloro-anilino)-1,3-diazacyclopentene-(2), M.P. 172–173° C., of the formula

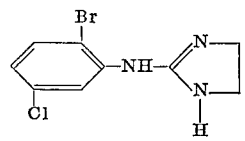

was prepared from N-(2-bromo-5-chloro-phenyl)-isothiouronium hydroiodide and ethylenediamine.

Its thin-layer-chromatographically pure hydrochloride had a melting point of 255–256° C.

EXAMPLE 6

Preparation of 2-(2'-chloro-5'-bromo-anilino)-1,3-diazacyclopentene-(2) by method A 129 gm. (0.75 mol) of 4-chloro-aniline were subjected to the Sandmeyer Reaction with CuBr, yielding 165 gm. (93.5% of theory) of 2-chloro-5-bromo-nitrobenzene. The product was hydrogenated under normal conditions of temperature and pressure in the presence of Raney nickel as a catalyst until the calculated amount of hydrogen had been absorbed, yielding 90% of theory of 2-chloro-5-bromo-aniline, whose hydrochloride had a melting point of 190–193° C.

24.3 gm. (0.1 mol) of 2-chloro-5-bromo-aniline hydrochloride were admixed with 8 gm. (0.105 mol) of ammonium thiocyanate and 130 cc. of chlorobenzene, and the mixture was heated at 95–100° C. for about eight hours. Thereafter, the reaction mixture was cooled, and the precipitate was collected by vacuum filtration, washed with water and petroleum ether, digested with 200 cc. of water, 200 cc. of petroleum ether were added, the solution was made alkaline with sodium carbonate, and the precipitate formed thereby was collected by vacuum filtration. 41.4% of theory of N-(2-chloro-5-bromo-phenyl)-isothiourea, M.P. 131–133° C., were obtained.

11 gm. (0.041 mol) of N-(2-chloro-5-bromo-phenyl)-isothiourea were admixed with 40 cc. of methanol and 3.8 cc. of methyliodide, and the mixture was boiled for 1.5 hours. Thereafter, the reaction solution was evaporated, and the residue was dried. The N-(2-chloro-5-bromo-phenyl)-isothiouronium hydroiodide thus obtained was admixed with 40 cc. of methanol and 4.1 cc. of ethylenediamine (150% of the stoichiometrically required amount), and the mixture was refluxed for 17 hours.

Thereafter, the methanol and the unreacted excess ethylenediamine were distilled off in vacuo, the residue was dissolved in a small amount of methanol, and the solution was made alkaline with aqueous 50% potassium hydroxide, cooled and then vigorously stirred with petroleum ether. The precipitate was collected by vacuum filtration, washed with water and dried. 6.0 gm. (53.0% of theory) of 2-(2'-chloro-5'-bromo-anilino)-1,3-diazacyclopentene-(2), M.P. 157-160° C., of the formula

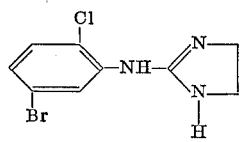

were obtained.

Its thin-layer-chromatographically pure hydrochloride had a melting point of 251-253° C.

*Analysis (hydrochloride).*—Calculated (percent): C, 34.75; H, 3.24; N, 13.51; Cl, 22.79; Br, 25.69. Found (percent): C, 34.58; H, 3.39; N, 13.32; Cl, 22.98; Br, 25.65.

EXAMPLE 7

Using a procedure analogous to that described in Example 6, 2 - (2',5' - difluoro-anilino)-1,3-diazacyclopentene-(2), M.P. 138-141° C., of the formula

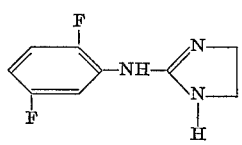

was prepared starting from 2,5-difluoro-aniline hydrochloride through the intermediates N-(2,5-difluoro-phenyl)-isothiourea, M.P. 203° C., and N-(2-5-difluoro-phenyl)-S-methylisothiouronium hydroiodide. The yield was 19.6% of theory.

Its thin-layer-chromatographically pure hydrochloride had a melting point of 205-206° C.

EXAMPLE 8

Using a procedure analogous to that described in Example, 6, 2-(2',4'-difluoro-anilino)-1,3-diazacyclopentene-(2), M.P. 123-126° C. after recrystallization from a mixture of benzene and petroleum ether having a boiling point from 40-80° C., was prepared starting from 2,4-difluoro-aniline hydrochloride.

Its nitrate, obtained by dissolving the free base in ether and acidifying the solution with concentrated nitric acid until it reacted acted to Congo red, was thin-layer-chromatographically pure and had a melting point of 121-121.5° C. after recrystallization from a mixture of methanol and ether.

EXAMPLE 9

Preparation of 2-(2'-bromo-5'-trifluoromethyl-anilino)-1,3-diazacyclopentene-(2) by method A A mixture of 8.3 gm. (0.028 mol) of N-(2-bromo-5-trifluoromethyl-phenyl)-isothiourea, 2.5 cc. of methyliodide and 30 cc. of methanol was boiled for two hours, yielding N - (2 - bromo - 5 - trifluoromethyl - phenyl) - S-methylisothiouronium hydroiodide. This product was admixed with 2.8 cc. of ethylenediamine and 30 cc. of methanol, and the mixture was refluxed for 16 hours. Thereafter, the methanol and the excess unreacted ethylenediamine were distilled off in vacuo, the residue was taken up in a small amount of methanol, and the solution was made alkaline with aqueous 50% potassium hydroxide. The initially oily precipitate formed thereby was made to cyclopentene-(2) was prepared from N-(2-chloro-3-tri- and was then filtered off, washed with water and dried. 6.0 gm. (69.5% of theory) of 2-(2'-bromo-5'-trifluoromethyl-anilino)-1,3-diazacyclopentene-(2), M.P. 144-145° C. after recrystallization from benzene/petroleum ether, of the formula

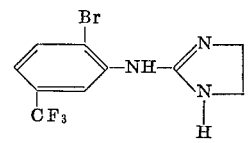

were obtained.

Its nitrate had a melting point of 161-162° C.

EXAMPLE 10

Using a procedure analogous to that described in Example 1, 2-(2'-chloro-3'-fluoro-anilino)-1,3-diazacyclopentene-(2) was prepared from N-(2-chloro-3-fluorophenyl)-S-methyl-isothiouronium hydroiodide and ethylenediamine.

EXAMPLE 11

Using a procedure analogous to that described in Example 1, 2-(2'-chloro-5'-fluoro-anilino)-1,3-diazacyclopentene-(2) was prepared from N-(2-chloro-5-fluorophenyl)-S-methyl-isothiouronium hydroiodide and ethylenediamine.

EXAMPLE 12

Using a procedure analogous to that described in Example 1, 2-(2'-chloro-3'-bromo-anilino)-1,3-diazacyclopentene-(2) was prepared from N-(2-chloro-3-bromophenyl)-S-methyl-isothiouronium hydroiodide and ethylenediamine.

EXAMPLE 13

Using a procedure analogous to that described in Example 1, 2-(2'-chloro-3'-trifluoromethyl-anilino)-1,3-diazacyclopentene-(2) was prepared from N-(2-chloro-3-trifluoromethyl-phenyl) - S - methyl-isothiouronium hydroiodide and ethylenediamine.

EXAMPLE 14

Using a procedure analogous to that described in Example 1, 2-(2'-bromo-3'-fluoro-anilino)-1,3-diazacyclopentene-(2) was prepared from N-(2-bromo-3-fluorophenyl)-S-methyl-isothiouronium hydroiodide and ethylenediamine.

EXAMPLE 15

Using a procedure analogous to that described in Example 1, 2-(2'-bromo-4'-fluoro-anilino) - 1,3 - diazacyclopentene-(2) was prepared from N-(2-bromo-4-fluorophenyl)-S-isothiouronium hydroiodide and ethylenediamine.

EXAMPLE 16

Using a procedure analogous to that described in Example 1, 2 - (2'-bromo-5'-fluoro-anilino)-1,3-diazacyclopentene-(2) was prepared from N-(2-bromo-5-fluorophenyl)-S-methyl-isothiouronium hydroiodide and ethylenediamine.

EXAMPLE 17

Using a procedure analogous to that described in Example 1, 2 - (2'-bromo-3'-trifluoromethyl-anilino)-1,3-diazacyclopentene-(2) was prepared from N-(2-bromo-3-trifluoromethyl-phenyl)-S-methyl - isothiouronium hydroiodide and ethylenediamine.

EXAMPLE 18

Using a procedure analogous to that described in Example 1, 2 - (2'-bromo-4'-trifluoromethyl-anilino)-1,3-diazacyclopentene-(2) was prepared from N-(2-bromo-4- trifluoromethyl-phenyl)-S-methyl-isothiouronium hydroiodide and ethylenediamine.

EXAMPLE 19

Using a procedure analogous to that described in Example 1, 2 - (2'-chloro-4'-cyano-anilino)-1,3-diazacyclopentene-(2) was prepared from N-(2-chloro - 4 - cyanophenyl)-S-methyl-isothiouronium hydroiodide and ethylenediamine.

The compounds embraced by Formula I above and their non-toxic, pharmacologically acceptable acid addition salts have useful pharmacodynamic properties. More particularly, these compounds exhibit hypotensive activities in warm-blooded animals; their advantage over known compounds of similar structure is that the gastric juice secretion-inhibiting side effect is substantially less pronounced than in said related known compounds, as demonstrated by the following comparative tests.

The tests served for the determination of the influence of the test compounds upon the gastric juice output of the stomach of rats pursuant to the method of Shay et al., Gastroenterology, vol. 5, page 43 (1945). The tests were made on juvenile rats having a body weight of 100 to 150 gm. For at least two days prior to the start of the tests the rats were fed only white bread, and during the last 24 hours they received only distilled water in order to empty the stomach. Ten rats per dose were used.

The test compounds were injected subcutaneously at dosage levels of 10, 3, 1, 0.3 and 0.1 mgm./kg. in physiological saline solution. The animals were anesthetized with ether, and then an incision was made in the abdominal wall below the sternum along the linea alba. A ligature was applied around the pylorus. The abdominal muscles and the skin were then successively carefully clamped or sutured. The animal was weighed, and the corresponding dose of the compound to be tested was injected. In each test series two control animals were administered only physiological saline solution.

After four hours the rats were killed with ether. The abdominal cavity was opened, the cranial esophagus of the cardia was clamped off, the esophagus and the duodenum were severed from the stomach, the stomach contents were emptied into a graduated cylinder, and the volume was recorded. The stomach was then rinsed twice with distilled water, and the rinses were added to the contents of the graduated cylinder. The contents of the cylinder wee then filtered into a small Erlenmeyer flask, the graduated cylinder, the funnel and the filter were rinsed with distilled water, and the rinse water was added to the contents of the flask. About two drops of a mixed indicator (p - dimethyl - amino - azobenzene and phenolphthalein) were added to the contents of the flask, and the solution was titrated against 0.1 N sodium hydroxide. The first end point, indicated by a color change from red to salmon, occurred at pH 2.9; the second end point, indicated by a color change from salmon to yellow, occurred at pH 4.0; and the third end point, indicated by a color change from yellow to pink, occurred at pH 8.5. The consumption of sodium hydroxide up to the first end point indicated the amount of free hydrochloric acid in the stomach contents. In order to determine the amount of bonded HCl, the median value of the second and third end point was calculated, from which the amount of free HCl was subtracted. The total consumption of NaOH at the third end point was designated as the total acidity.

The $ED_{50}$-values shown in the following table were graphically determined from the individual test dosages and represent the dose of the test compound which produces a 50% reduction in the secreted gastric juice volume or a 50% decrease in the total acidity, compared to the controls. The smaller the $ED_{50}$, the greater the gastric juice secretion-inhibiting activity of the particular compound. The last column in the table also shows the average of the two $ED_{50}$ values given.

TABLE

| Compound | $ED_{50}$ in mgm./kg. | | |
|---|---|---|---|
| | Gastric juice volume | Total acidity | Average |
| Prior art: Netherlands application No. 6411516: | | | |
| 2-(2',6'-dichloro-anilino)-1,3-diazacyclopentene-(2)·HCl | 0.043 | 0.036 | 0.039 |
| 2-(2',6'-dibromo-anilino)-1,3-diazacyclopentene-(2)·HCl | 0.180 | 0.100 | 0.140 |
| Present invention: | | | |
| 2-(2'-chloro-4'-trifluoromethyl-anilino)-1,3-diazacyclopentene-(2)·HCl | >10 | >10 | >10 |
| 2-(2'-chloro-5'-bromo-anilino)-1,3-diazacyclopentene-(2)·HCl | >10 | 4 | 7 |
| 2-(2'-chloro-4'-bromo-anilino)-1,3-diazacyclopentene-(2)·HCl | 3.5 | 3.2 | 2.9 |

The hypotensive activity of the compounds embraced by Formula I above and their non-toxic acid addition salts was ascertained by direct measurement of the blood pressure changes in the carotid artery of rabbits after administration of the compounds.

The test method was carried out as follows: Bastard rabbits of both sexes, with a body weight of about 2 to 3 kg., were first weighed and then anesthetized with 0.75 gm./kg. of urethane i.p.

The fur on the neck of the animals was removed, a longitudinal incision 7 to 10 cm. long was made, and the trachea was exposed into which a respiration canula was tied in order to be able to apply artificial respiration to the animal in an emergency. One of the two carotid arteries lying on both sides of the trachea was exposed, and the canula of a manometer was tied into it. The jugular vein was exposed from the fatty tissue, and a canula, provided with a stopcock, was tied into it as a means for intravenous administration of the test compounds.

The body temperature of the animal was continuously measured rectally and, if necessary, was maintained at 37 to 38° C. with a heating pad.

The compound under investigation was injected into the jugular vein at dosages of 0.01, 0.03, 0.1, 1 and 3 mgm./kg. body weight in increasing as well as decreasing sequence, and the resulting blood pressure changes were recorded. Between injections, a waiting period equal to double the period of effective action was used before the next injection was administered. One compound was tested on each animal, and from 2 to 9 tests per compound were performed.

All of the compounds embraced by Formula I and their non-toxic acid addition salts were found to be effective hypotensives.

For pharmaceutical purposes the compounds of the Formula I or their non-toxic acid addition salts are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds of the Formula I or their non-toxic acid addition salts is from 0.00083 to 0.50 mgm./kg. body weight. A dosage unit composition comprising a compound of the Formula I or a non-toxic acid addition salt thereof as an active ingredient may, if desired, also contain an effective unit dose of another pharmacodynamically active ingredient, such as a saluretic agent, i.e. a compound which promotes the discharge of salt through the urine.

The following examples illustrate a few dosage unit compositions according to the present invention and represent the best mode contemplated of putting the invention to practical use. The parts are parts by weight unless otherwise specified.

EXAMPLE 20

Tablets

The tablet composition was compounded from the following ingredients:

| | Parts |
|---|---|
| 2-(2'-bromo-5'-chloro-anilino) - 1,3 - diazacyclopentene-(2) hydrochloride | 0.30 |
| Lactose | 53.00 |
| Corn starch | 31.60 |
| Soluble starch | 4.00 |
| Mangnesium stearate | 1.00 |
| Total | 90.00 |

The individual ingredients were admixed with each other in a manner customary for manufacture of pharmaceutical tablets, and the mixture was pressed into 90 mgm.-tablets. Each tablet contained 0.3 mgm. of the diazacyclopentene compound and, when administered perorally to a warm-blooded animal of about 60 kg. body weight in need of such treatment, produced very good hypotensive effects without appreciably reducing the gastric juice secretion rate in the stomach.

EXAMPLE 21

Drop solution

The solution was compounded from the following ingredients:

| | Parts |
|---|---|
| 2-(2'-chloro - 4' - fluoro - anilino - 1,3 - diazacyclopentene-(2) hydrochloride | 0.02 |
| p-Hydroxy-benzoic acid methyl ester | 0.07 |
| p-Hydroxy-benzoic acid propyl ester | 0.03 |
| Demineralized water, q.s. ad 100.00 parts by vol. | |

The individual ingredients were dissolved in a sufficient amount of demineralized water, the solution was diluted with additional demineralized water to the desired volume, and the finished solution was filtered. 1 cc. of solution (about 20 drops) contained 0.2 mgm. of the diazacyclopentene compound and, when administered perorally to a warm-blooded animal of about 60 kg. body weight in need of such treatment, produced very good hypotensive effects without appreciably reducing the gastric juice secretion rate in the stomach.

EXAMPLE 22

Hypodermic solution

The solution was compounded from the following ingredients:

| | Parts |
|---|---|
| 2-(2'-chloro-4'-trifluoromethylanilino) - 1,3-diazaclopentene-(2) hydrochloride | 0.75 |
| Sodium chloride | 18.00 |
| Distilled water, q.s. ad 2000.00 parts by vol. | |

The individual ingredients were dissolved in a sufficient amount of distilled water, the solution was diluted with additional distilled water to the desired volume, the dilute solution was filtered until free from suspended particles and then filled into 2 cc.-ampules, which were subsequently sterilized and sealed. Each ampule contained 0.75 mgm. of the diazacyclopentene compound, and when the contents thereof were administered by intravenous injection to a warm-blooded animal of about 60 kg. body weight in need of such treatment, very good hypotensive effects were obtained without appreciably reducing the gastric juice secretion rate in the stomach.

EXAMPLE 23

Suppositories

The suppository composition was compounded from the following ingredients:

| | Parts |
|---|---|
| 2-(2'-chloro - 4' - bromo-anilino) - 1,3 - diazacyclopentene-(2) | 7.0 |
| Lactose | 244.2 |
| Cocoa butter, q.s. ad 1700.0 parts | |

The cocoa butter was melted, the remaining ingredients were stirred into it, the mixture was homogenized, and the finished composition was poured into cooled suppository molds, each holding 1700 mgm. of the composition. Each suppository contained 7.0 mgm. of the diazacyclopentene compound and, when administered by the rectal route to a warm-blooded animal of about 60 kg. body weight in need of such treatment, produced very good hypotensive effects without appreciably reducing the gastric juice secretion rate in the stomach.

Analogous results were obtained when an equal amount of any one of the other compounds embraced by Formula I above or a non-toxic acid addition salt thereof was substituted for the particular diazacyclopentene compounds in Examples 20 to 23. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention.

We claim:

1. A hypotensive composition in dosage unit form consisting essentially of an inert pharmacetical carrier and an effective hypotensive amount of a compound of a formula selected from the group consisting of

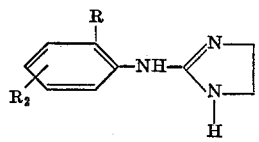

and

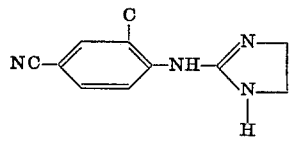

wherein
$R_1$ is chlorine or bromine and $R_2$ is 3-, 4- or 5-trifluoromethyl, or a non-toxic, pharmacologically acceptable acid addition salt thereof.

2. The method of lowering the blood pressure of a warm-blooded animal in need of such treatment, which comprises perorally or parenterally administering to said animal an effective hypotensive amount of a compound of a formula selected from the group consisting of

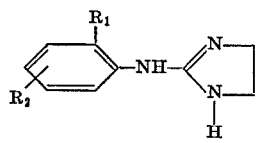

and

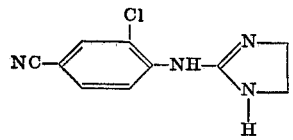

wherein
R₁ is chlorine or bromine and R₂ is 3-, 4- or 5-trifluoromethyl, or a non-toxic, pharmacologically acceptable acid addition salt thereof.

3. A hypotensive composition in dosage unit form according to claim 1, wherein said compound is 2-(2'-chloro-3'-trifluoromethyl-anilino)-1,3-diazacyclopentene-(2) or a non-toxic, pharmacologically acceptable acid addition salt thereof.

4. A hypotensive composition in dosage unit form according to claim 1, wherein said compound is 2-(2'-chloro-4'-trifluoromethyl-anilino)-1,3-diazacyclopentene-(2) or a non-toxic, pharmacologically acceptable acid addition salt thereof.

5. A hypotensive composition in dosage unit form according to claim 1, wherein said compound is 2-(2'-chloro-5'-trifluoromethyl-anilino)-1,3-diazacyclopentene-(2) or a non-toxic, pharmacologically acceptable acid addition salt thereof.

6. A hypotensive composition in dosage unit form according to claim 1, wherein said compound is 2-(2'-bromo-3'-trifluoromethyl-anilino)-1,3-diazacyclopentene-(2) or a non-toxic, pharmacologically acceptable acid addition salt thereof.

7. A hypotensive composition in dosage unit form according to claim 1, wherein said compound is 2-(2'-bromo-4'-trifluoromethyl-anilino)-1,3-diazacyclopentene-(2) or a non-toxic, pharmacologically acceptable acid addition salt thereof.

8. A hypotensive composition in dosage unit form according to claim 1, wherein said compound is 2-(2'-bromo-5'-trifluoromethyl-anilino)-1,3-diazacyclopentene-(2) or a non-toxic, pharmacologically acceptable acid addition salt thereof.

9. The method according to claim 2, wherein said compound is 2-(2'-chloro-3'-trifluoromethyl-anilino)-1,3-diazacyclopentene-(2) or a non-toxic, pharmacologically acceptable acid addition salt thereof.

10. The method according to claim 2, wherein said compound is 2-(2'-chloro-4'-trifluoromethyl-anilino)-1,3-diazacyclopentene-(2) or a non-toxic, pharmacologically acceptable acid addition salt thereof.

11. The method according to claim 2, wherein said compound is 2-(2'-chloro-5'-trifluoromethyl-anilino)-1,3-diazacyclopentene-(2) or a non-toxic, pharmacologically acceptable acid addition salt thereof.

12. The method according to claim 2, wherein said compound is 2-(2'-bromo-3'-trifluoromethyl-anilino)-1,3-diazacyclopentene-(2) or a non-toxic, pharmacologically acceptable acid addition salt thereof.

13. The method according to claim 2, wherein said compound is 2-(2'-bromo-4'-trifluoromethyl-anilino)-1,3-diazacyclopentene-(2) or a non-toxic, pharmacologically acceptable acid addition salt thereof.

14. The method according to claim 2, wherein said compound is 2-(2'-bromo-5'-trifluoromethyl-anilino)-1,3-diazacyclopentene-(2) or a non-toxic, pharmacologically acceptable acid addition salt thereof.

References Cited

UNITED STATES PATENTS 3,190,802   6/1965   Zeile et al. _____ 260—309.6

FOREIGN PATENTS 625,631   8/1961   Canada _____ 260—309.6

OTHER REFERENCES

Netherlands application 6411516, April 1965.

ALBERT T. MEYERS, Primary Examiner

D. M. STEPHENS, Assistant Examiner

U.S. Cl. X.R.

260—309.6

UNITED STATES PATENT OFFICE
CERTIFICATE OF CORRECTION

Patent No. 3,595,961                    Dated July 27, 1971

Inventor(s) HELMUT STÄHLE, HERBERT KÖPPE, KARL ZEILE, MARTIN WOLF and WOLFGANG HOEFKE It is certified that error appears in the above-identified patent and that said Letters Patent are hereby corrected as shown below:

Column 5, line 74:  cancel "cyclopentene-(2) was prepared from N-(2-chloro-3-tri-" and insert --crystallize by cooling the reaction mixture on an ice bath--

Column 7, line 47:  "wee" should read --were--.

Column 10, line 42:  in the first formula "R" should read --R$_1$--;

line 48:  in the 2nd formula "C" should read --Cl--.

Signed and sealed this 28th day of March 1972.

(SEAL)
Attest:

EDWARD M. FLETCHER, JR.
Attesting Officer

ROBERT GOTTSCHALK
Commissioner of Patents